(12) United States Patent
Wang et al.

(10) Patent No.: US 7,181,053 B2
(45) Date of Patent: Feb. 20, 2007

(54) USB DRIVE MASS STORAGE DEVICE WITH OPTICAL FINGERPRINT IDENTIFICATION SYSTEM

(75) Inventors: Yu-Hsi Wang, Taipei (TW); Shih-Feng Lu, Taipei (TW); Ting-Kuo Hua, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 720 days.

(21) Appl. No.: 10/640,012

(22) Filed: Aug. 14, 2003

(65) Prior Publication Data

US 2005/0036666 A1 Feb. 17, 2005

(51) Int. Cl.
*G06K 9/00* (2006.01)

(52) U.S. Cl. .................. 382/124; 902/3; 340/5.83; 283/68

(58) Field of Classification Search ............... 382/100, 382/115, 124, 126; 902/3; 340/5.83; 283/68
See application file for complete search history.

(56) References Cited

U.S. PATENT DOCUMENTS 6,628,814 B1 * 9/2003 Shapiro ................. 382/127
6,886,104 B1 * 4/2005 McClurg et al. ............ 713/300
6,928,311 B1 * 8/2005 Pawluczyk et al. ......... 600/310
6,970,584 B2 * 11/2005 O'Gorman et al. ......... 382/126
2004/0206824 A1 * 10/2004 Lapstun et al. ......... 235/462.44
2006/0062437 A1 * 3/2006 O'Gorman et al. ......... 382/124

\* cited by examiner

*Primary Examiner*—Vikkram Bali
*Assistant Examiner*—Anand Bhatnager
(74) *Attorney, Agent, or Firm*—Troxell Law Office, PLLC

(57) ABSTRACT

A USB drive mass storage device mainly includes a housing having a predetermined size, in which an optical fingerprint identification system is mounted for use with the USB drive. A printed circuit board (PCB) is located on an inner bottom of the housing with a universal serial bus (USB) plug projected from a front end of the housing. The optical fingerprint identification system includes an image sensing element and an optical prism located across front and rear ends, respectively, of the PCB, so that a space above the PCB provides an optical path for the optical fingerprint identification system. The housing is provided at a rear end with a pivotally connected rear cover to enable easy protection of and access to a fingerprint surface on the optical prism.

5 Claims, 5 Drawing Sheets

USB DRIVE MASS STORAGE DEVICE WITH OPTICAL FINGERPRINT IDENTIFICATION SYSTEM

FIELD OF THE INVENTION

The present invention relates to a USB drive mass storage device with a built-in optical fingerprint identification system, and more particularly to a USB drive having a circuit board mounted in a housing, and an image sensor and an optical prism of the optical fingerprint identification system mounted across front and rear ends, respectively, of the circuit board, so that a space above the circuit board forms an optical path for the fingerprint identification system. The housing also includes a pivotally connected rear cover to protect and provide an access to a fingerprint surface on the optical prism, so that the optical fingerprint identification system and the USB drive are associated with each other for convenient use thereof.

BACKGROUND OF THE INVENTION

A USB drive mass storage device has the advantages of having large memory capacity and small volume to enable easy carrying thereof, and therefore becomes a popular storage medium for use with a computer system. For the data stored in USB drive to be accessed only under an authorized condition or simply functioned as a finger print reader, there is a microelectronic sensor(chip-type) fingerprint identification system developed in the market for associating with the USB drive. However, the following disadvantages are found in the chip-type fingerprint identification system used with the USB drive:

1. Static-caused destruction is a fatal wound to semiconductor elements. A fingerprint surface (or sensing surface) in the chip-type fingerprint identification system is configured with semiconductor elements, and the chip also includes circuit-connected controls. When a person presses finger tip against the fingerprint surface to contact with the chip for the purpose of identifying fingerprint, the static electricity normally existing on human body would cause charge or discharge via the contact area and therefore interferes with the operation of the chip-type fingerprint identification system, or even destroys the circuit thereof, particularly in areas having a dry climate.

2. The fingerprint surface of the chip-type fingerprint identification system is in direct contact with a user's finger and tends to become worn out or dirt, which would adversely affect the usable life and identification efficiency of the chip-type fingerprint identification system.

3. As being limited by the manufacturing process and good yield of the chip, the fingerprint surface of the chip-type fingerprint identification system usually has a quite small area to adversely affect the identification efficiency of the system. In the event a large fingerprint surface is provided, a relatively high cost of the chip is required to adversely affect the wide application of the chip-type fingerprint identification system.

Therefore, it is desirable to develop a USB DRIVE MASS STORAGE DEVICE having an improved fingerprint identification system to eliminate the drawbacks existing in the conventional chip-type fingerprint identification system when using with the USB drive.

SUMMARY OF THE INVENTION

A primary object of the present invention is to provide a USB drive mass storage device with optical fingerprint identification system. In the present invention, the USB drive mass storage device mainly includes a housing having a predetermined size, in which an optical fingerprint identification system is mounted for use with the USB drive mass storage device. A printed circuit board (PCB) for the USB drive is located on an inner bottom of the housing with a universal serial bus (USB) plug projected from a front end of the housing. The optical fingerprint identification system includes an image sensor, an optical lens with stopper, and an optical prism located across front and rear ends, respectively, of the PCB, so that a space above the PCB provides an optical path for the optical fingerprint identification system. The housing is provided at a rear end with a pivotally connected rear cover to protect and provide an access to a fingerprint surface on the optical prism.

With the above arrangements, disadvantages in using the USB drive with the conventional chip-type fingerprint identification system may be avoided to improve the effect and lower the cost of the product.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
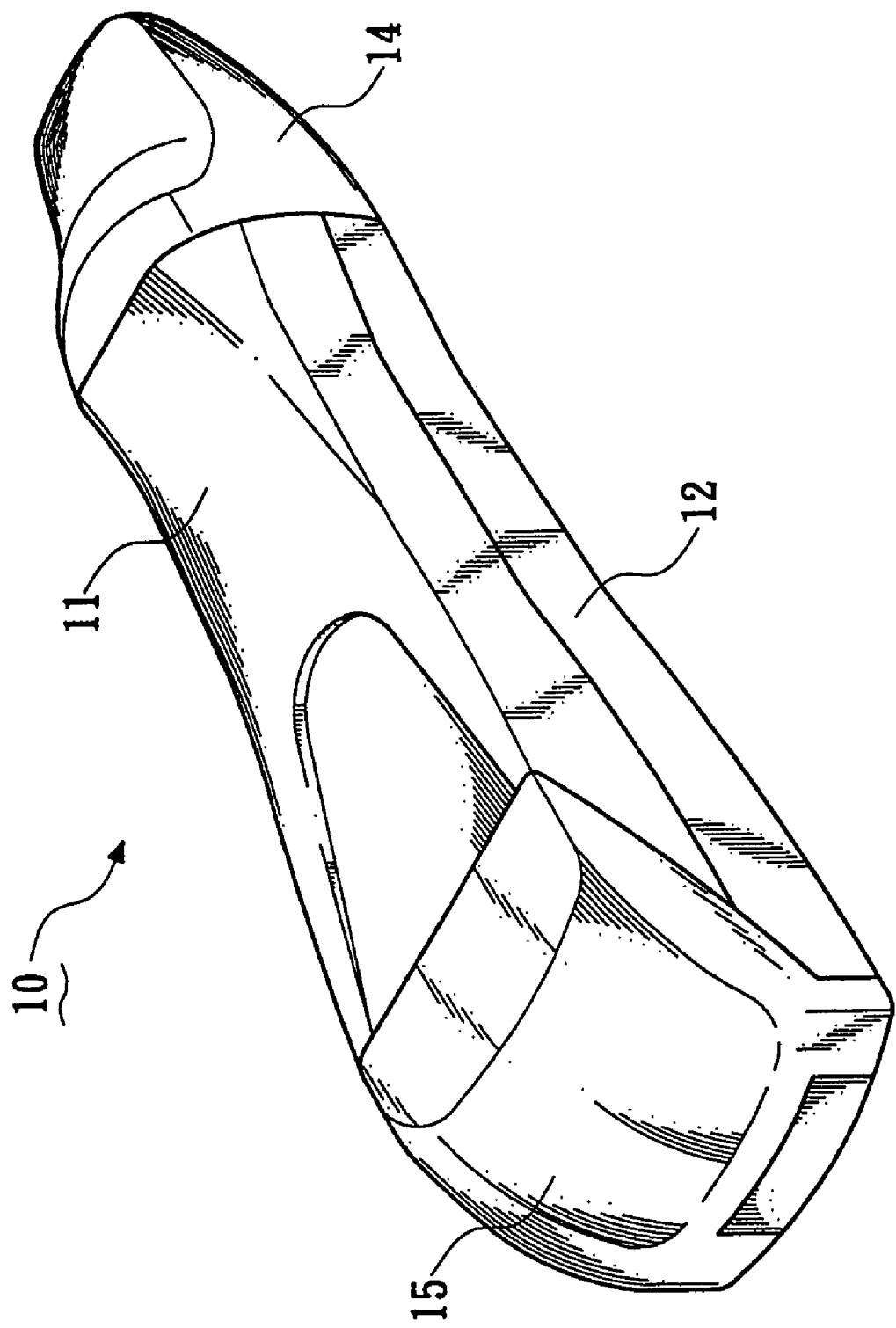
FIG. 1 is an assembled perspective view of a USB drive with optical fingerprint identification system according to the present invention.
Figure 2:
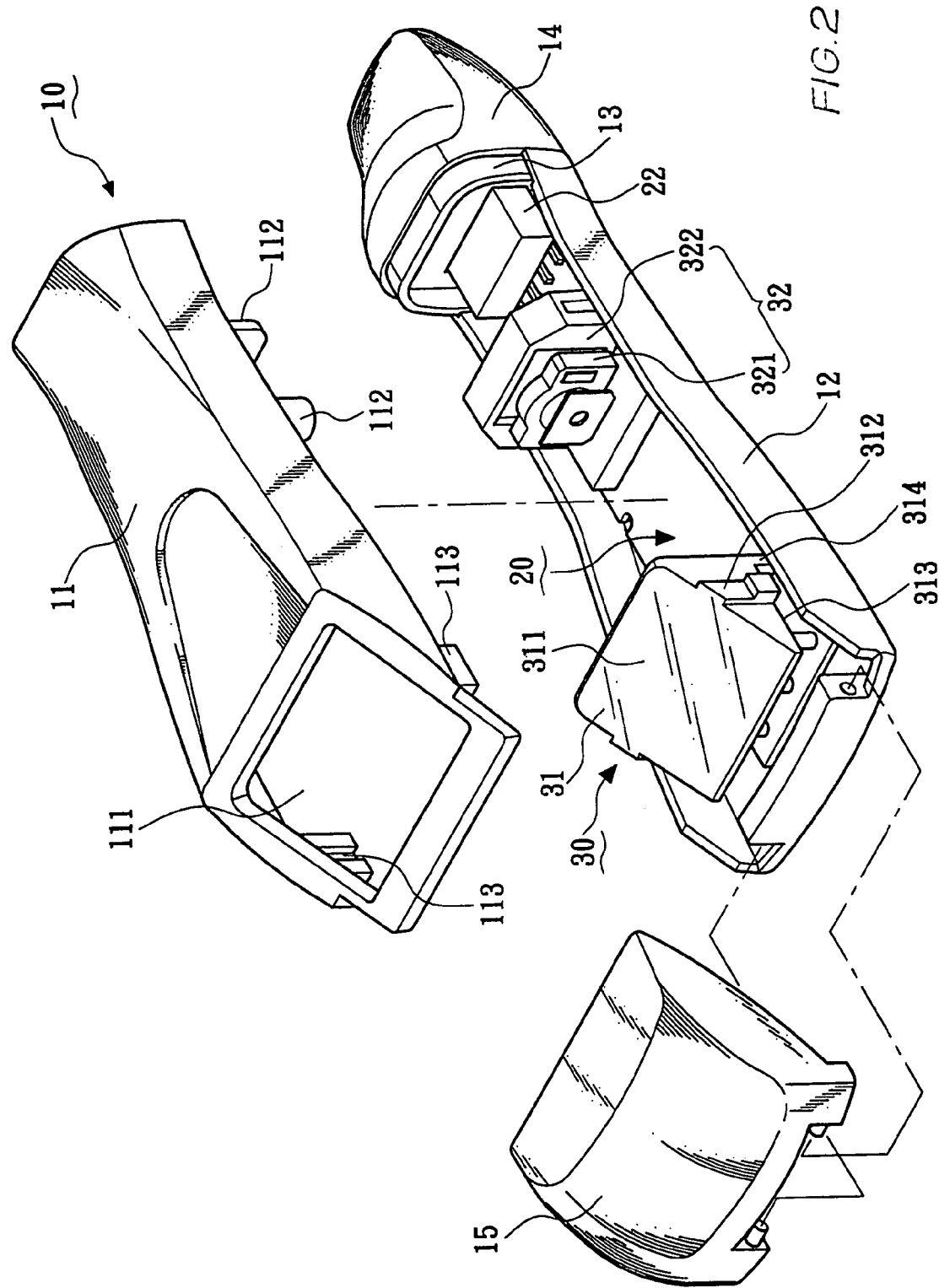
FIG. 2 is a partially exploded perspective view of the USB drive of FIG. 1.
Figure 3:
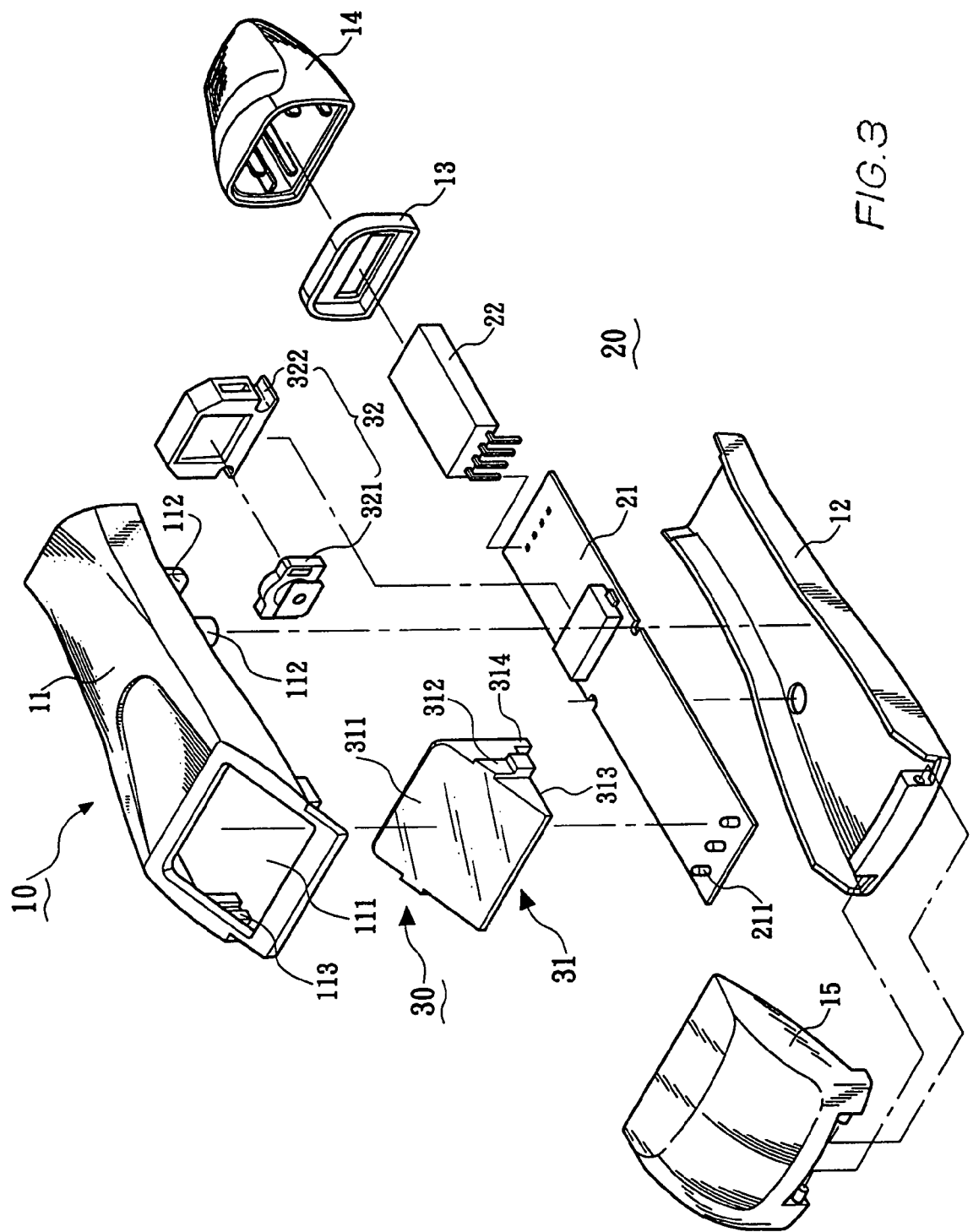
FIG. 3 is a fully exploded perspective view of the USB drive of FIG. 2.
Figure 4:
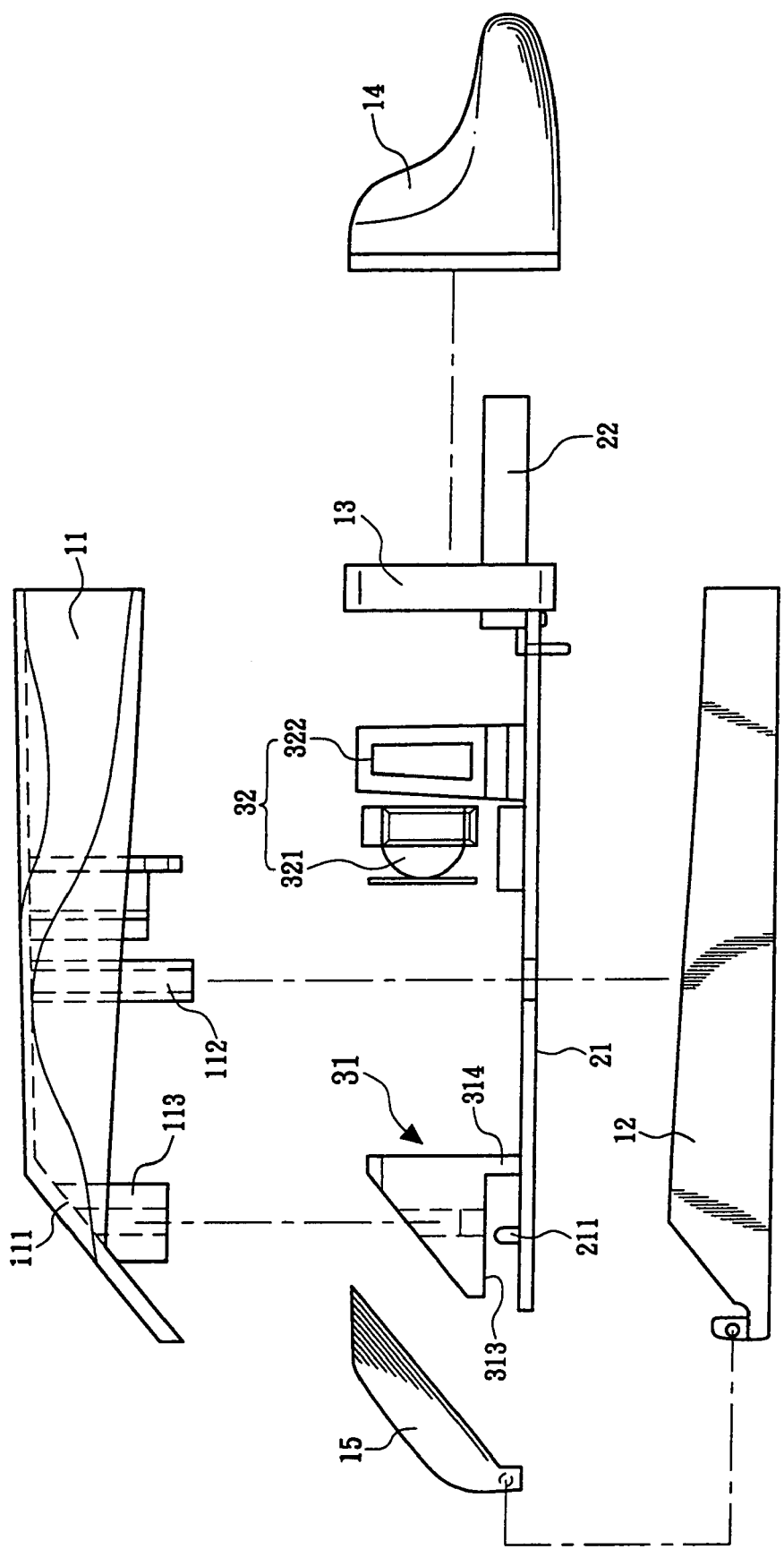
FIG. 4 is a fully exploded side view of FIG. 2.

Please refer to FIGS. 1 to 4 in which a USB drive with optical fingerprint identification system according to the present invention is shown. As shown, the USB drive mainly includes a housing 10, a printed circuit board (PCB) 20, and an optical fingerprint identification system 30.

The housing 10 includes an upper cover 11, a lower cover 12, a front frame 13, a front cover 14, and a rear cover 15. The upper and lower covers 11, 12, and the front frame 13 are fixedly connected together to form an integral body. The front cover 14 is removably closed to a front side of the front frame 13. And, the rear cover 15 is pivotally connected at a lower side to a rear end of the lower cover 12 to expose or close a beveled opening 111 provided at a rear end of the upper cover 11.

The PCB 20 is located on an inner bottom surface of the housing 10, and includes a circuit board 21 and a universal serial bus (USB) input/output interface in the form of a USB plug 22. Necessary components and related connecting circuits (not shown) for a USB drive are mounted on the circuit board 21. In assembling the USB drive of the present invention, the PCB 20 is locked with screws to a plurality of corresponding screw seats 112 downward extended from an inner side of the upper cover 11 and thereby located in place in the housing 10. The USB plug 22 is projected from the housing 10 via the front frame 13 for inserting into a USB socket on a computer system. When the USB drive is not in use, the front cover 14 is closed to the front frame 13 to shield and protect the USB plug 22, so that the USB drive may be conveniently carried along with a user.

The optical fingerprint identification system 30 includes an optical prism 31 and an image sensing element 32. The image sensing element 32 includes an optical lens with stopper 321 and a seat 322 mounted with image sensor. The optical prism 31 and the image sensing element 32 are located across rear and front ends, respectively, of the circuit board 21, so that a space above the circuit board 21 forms an optical path for the optical fingerprint identification system 30. That is, light beams projected from the optical prism 31 passes through the space above the circuit board 21 and travel through the optical lens with stopper 321 then reach at the image sensor on the seat 322 of the image sensing element 32, so that the optical fingerprint identification system 30 has sufficient optical path space to fully extend its identifying function. Moreover, the optical prism 31 provides a fingerprint surface 311 that is larger area than that of a microelectronic chip-type fingerprint identification system. And, since the optical prism 31 is faced toward the beveled opening 111 at the rear end of the upper cover 11, it is easy for the user to press a thumb against the fingerprint surface 311 for the purpose of fingerprint identification.

In manufacture the USB drive of the present invention, the optical prism 31 is integrally formed at each lateral side with a retaining rib 312 for engaging with a retaining seat 113 correspondingly provided at each inner side of the upper cover 11, so that the optical prism 31 is held in place in the upper cover 11 behind the beveled opening 111. The optical prism 31 is provided at a front end of a bottom surface 313 with an integrally downward protruded vertical wall 314, so that a predetermined distance is provided between the bottom surface 313 of the optical prism 31 and a top of the circuit board 21 for accommodating a light emitting diode (LED) light 211 correspondingly provided on the circuit board 21 below the bottom surface 313. The vertical wall 314 also serves as an isolating means, outer surfaces of which are coated with a layer of mask to stop unwanted light emitted from the LED 211 through the gap between circuit board 21 and prism 31. This unique design will prevent the noise light to interfere formal light path.

Figure 5:
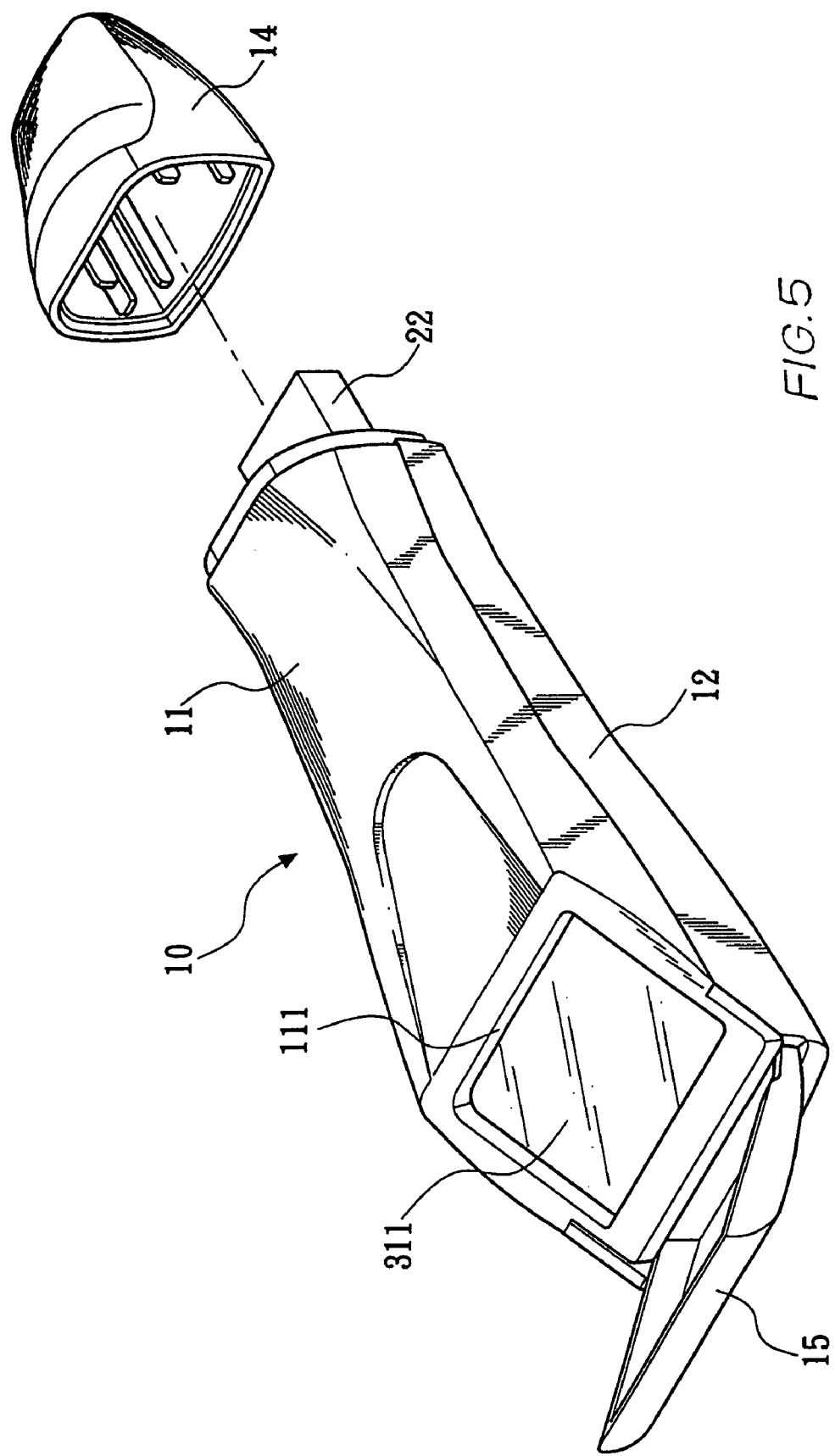
FIG. 5 is a perspective view of the present invention showing the use thereof.

With the above arrangements, the PCB 20 and the optical fingerprint identification system 30 may be well mounted in the housing 10 having a proper size to use together and achieve a better fingerprint identifying function. To use the present invention, simply open the front cover 14 to insert the USB plug 22 into the USB socket on a computer, and pivotally turn open the rear cover 15 to expose the fingerprint surface 311 behind the beveled opening 111, as shown in FIG. 5. Then, the user may easily press the finger tip against the fingerprint surface 311 to proceed with the fingerprint identifying procedure.

What is claimed is:

1. A USB drive mass storage device with optical fingerprint identification system, comprising a housing, a printed circuit board (PCB), and an optical fingerprint identification system;

said housing including an upper cover, a lower cover, a front frame, a front cover, and a rear cover; said front cover being removably closed to a front end of said housing, and said rear cover being pivotally connected at a lower side to a rear end of said housing to expose or close a beveled opening provided at a rear end of said upper cover;

said PCB being located on an inner bottom surface of said housing, and including a circuit board and a universal serial bus (USB) plug; necessary components and related connecting circuits for a USB drive being mounted on said circuit board, and said USB plug being projected from the front end of said housing and protectively shielded with said front cover when said USB plug is not in use, enabling said USB drive to be conveniently carried along with a user; and said optical fingerprint identification system including an optical prism, and an image sensing element; said image sensing element including a lens with stopper, an image sensor and a seat for said image sensor to mount thereon; said optical prism and said image sensing element being located across rear and front ends, respectively, of said circuit board, so that a space above said circuit board forms an optical path for said optical fingerprint identification system; said optical prism providing a fingerprint surface that faces toward said beveled opening at the rear end of said upper cover, enabling a user to easily press a thumb against said fingerprint surface for the purpose of fingerprint identification;

whereby said PCB and said optical fingerprint identification system may be well mounted in said housing that has a predetermined size to be used together and to achieve a better fingerprint identifying function.

2. The USB drive with optical fingerprint identification system as claimed in claim 1, wherein said upper cover has a plurality of screw seats downward extended from an inner side thereof, and said PCB is locked to said screw seats with screws and thereby located in place in said housing.

3. The USB drive with optical fingerprint identification system as claimed in claim 1, wherein said optical prism is integrally provided at each lateral side with a retaining rib, and said upper cover is correspondingly provided at each inner side surface with a retaining seat for engaging with said retaining rib and thereby holds said optical prism in place in said upper cover.

4. The USB drive with optical fingerprint identification system as claimed in claim 1, wherein said optical prism is integrally formed at a front end of a bottom surface with a downward protruded vertical wall, so that a predetermined distance is provided between said bottom surface of said optical prism and a top of said circuit board for accommodating a light emitting diode light (LED) correspondingly provided on said circuit board below the bottom surface of said optical prism.

5. The USB drive with optical fingerprint identification system as claimed in claim 4, wherein said vertical wall formed at the front end of the bottom surface of said optical prism is coated with a layer of mask to stop unwanted light emitted from the LED through the gap between circuit board and prism and prevent the noise light to interfere formal light path.

* * * * *